US012591913B2

(12) United States Patent
Boiarov et al.

(10) Patent No.: US 12,591,913 B2
(45) Date of Patent: Mar. 31, 2026

(54) SYSTEM AND METHOD FOR MACHINE LEARNING-BASED BRAND ADVERTISING RATE CALCULATION IN A VIDEO

(71) Applicants:Constructor Technology AG, Schaffhausen (CH); Constructor Education and Research Genossenschaft, Schaffhausen (CH)

(72) Inventors: Andrei Boiarov, Sofia (BG); Ilya Shimchik, Istanbul (TR); Nikita Firsakov, Istanbul (TR); Pavlo Bredikhin, Kharkov (UA); Sergey Ulasen, Singapore (SG); Serg Bell, Singapore (SG); Stanislav Protasov, Singapore (SG); Nikolay Dobrovolskiy, Sofia (BG); Nikita Tkachev, Sofia (BG)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 464 days.

(21) Appl. No.: 18/173,780

(22) Filed: Feb. 23, 2023

(65) Prior Publication Data

US 2024/0289846 A1 Aug. 29, 2024

(51) Int. Cl.
*G06Q 30/0273* (2023.01)
*G06V 20/40* (2022.01)

(52) U.S. Cl.
CPC ......... *G06Q 30/0273* (2013.01); *G06V 20/41* (2022.01); *G06V 20/46* (2022.01); *G06V 20/49* (2022.01)

(58) Field of Classification Search
CPC combination set(s) only.
See application file for complete search history.

(56) References Cited

U.S. PATENT DOCUMENTS

| | | | |
|---|---|---|---|
| 9,245,280 B2 | 1/2016 | Zheng et al. | |
| 2016/0227277 A1* | 8/2016 | Schlesinger et al. | ....................... H04N 21/442 |
| 2020/0387937 A1 | 12/2020 | Sheth et al. | |

FOREIGN PATENT DOCUMENTS

| | | |
|---|---|---|
| FR | 3109004 A1 | 10/2021 |
| IN | 201941004531 A | 8/2020 |

(Continued)

OTHER PUBLICATIONS

Dong Wu, et al. YOLOP:YouOnlyLookOnceforPanopticDrivingPerception, Mar. 26, 2022, 2108.11250.pdf.

(Continued)

*Primary Examiner* — Vu Le
*Assistant Examiner* — Matthew James Bodnark
(74) *Attorney, Agent, or Firm* — ESPE Legal Consultancy FZ-LLC

(57) ABSTRACT

A system and a method for performing brand detection and brand analysis in a video are disclosed herein. The method comprises receiving the video for performing the brand detection thereon; splitting the video for obtaining input video frames; performing an open set detection on the input video frames to compute instances of detecting brand media; determining an exact square region in which the brand media is occupied within the input video frame; resolving a scene understanding task in the input video frame; detecting crucial moments in the video; identifying an area on the input frame where a user's attention is focused to provide user focus index; generating heat maps using the detection of crucial moments and user focus index; and combining above inputs from the brand detection and the scene understanding into the heat maps for all the input video frames of the video for computing a brand advertising rate.

20 Claims, 4 Drawing Sheets

(56) References Cited

FOREIGN PATENT DOCUMENTS

| KR | 102380972 B1 | 3/2022 | |
| WO | WO2020161732 A1 * | 8/2020 | ............ G06Q 10/00 |
| WO | WO2021194090 A1 * | 9/2021 | ............ G06V 20/42 |

OTHER PUBLICATIONS

Chenge Li, et.al. See Tek: Very Large-Scale Open-set Logo Recognition with Text-Aware Metric Learning, 2022, Li SeeTek.pdf.
Olaf Ronneberger, et al. U-Net: Convolutional Networks for Biomedical Image Segmentation, May 18, 2015, 1505.04597.pdf.
Christoph Feichtenhofer, et al. SlowFast Networks for Video Recognition, Oct Oct. 29, 2019, 1812.03982.pdf.
Haoqi Fan, et al. Multiscale Vision Transformers, 2021, Fan_Multiscale_Vision_Transformers_ICCV_2021_paper.pdf.
Jake Snell, et al. Prototypical Networks for Few-shot Learning, Jun. 19, 2017, 1703.05175.pdf.
Prannay Khosla, et al. Supervised Contrastive Learning, Mar. 10, 2021, 2004.11362.pdf.

* cited by examiner

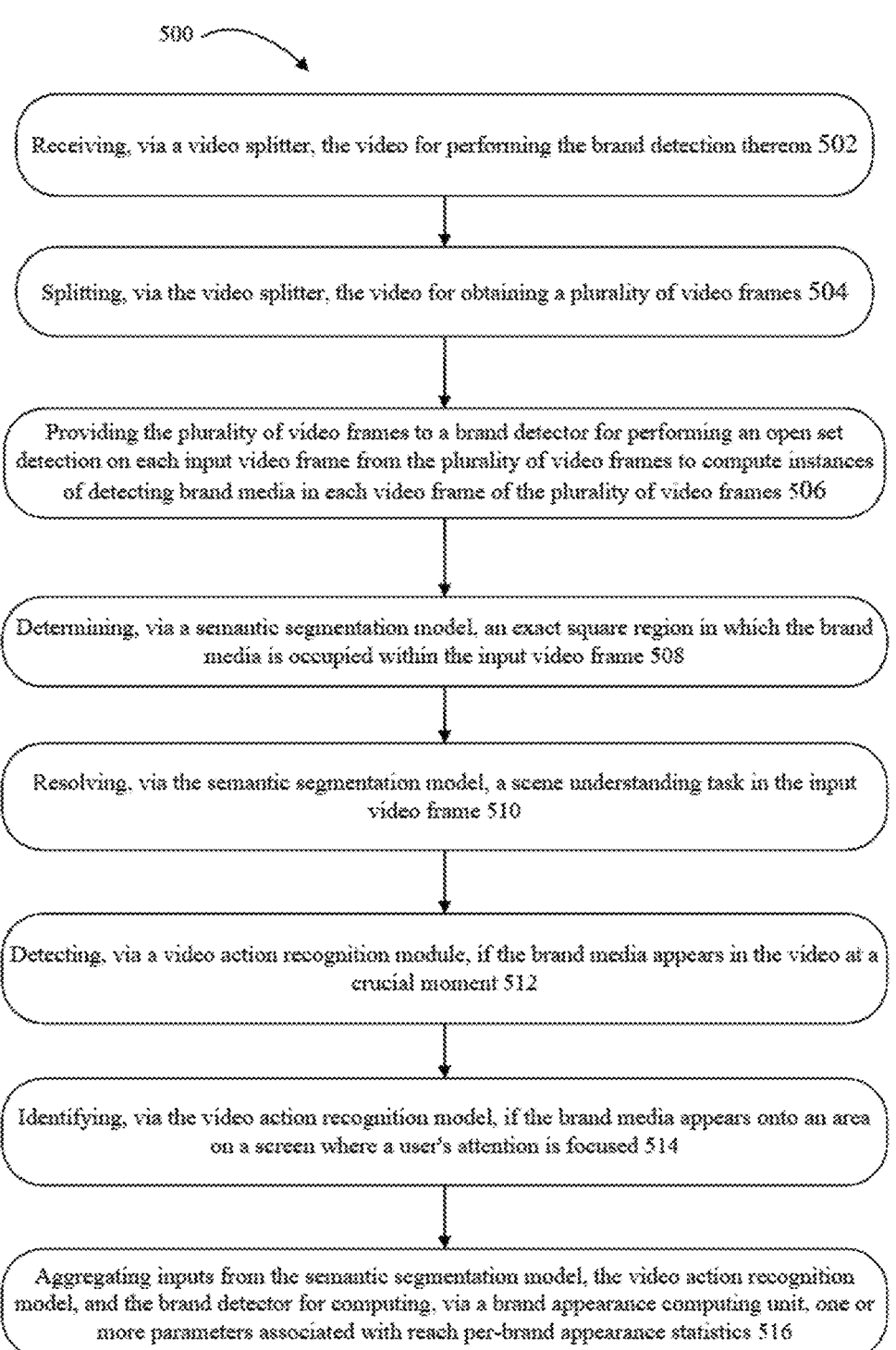

500

Receiving, via a video splitter, the video for performing the brand detection thereon 502

Splitting, via the video splitter, the video for obtaining a plurality of video frames 504

Providing the plurality of video frames to a brand detector for performing an open set detection on each input video frame from the plurality of video frames to compute instances of detecting brand media in each video frame of the plurality of video frames 506

Determining, via a semantic segmentation model, an exact square region in which the brand media is occupied within the input video frame 508

Resolving, via the semantic segmentation model, a scene understanding task in the input video frame 510

Detecting, via a video action recognition module, if the brand media appears in the video at a crucial moment 512

Identifying, via the video action recognition model, if the brand media appears onto an area on a screen where a user's attention is focused 514

Aggregating inputs from the semantic segmentation model, the video action recognition model, and the brand detector for computing, via a brand appearance computing unit, one or more parameters associated with reach per-brand appearance statistics 516

Figure 5

SYSTEM AND METHOD FOR MACHINE LEARNING-BASED BRAND ADVERTISING RATE CALCULATION IN A VIDEO

FIELD OF THE INVENTION

The present disclosure generally relates to video processing. In particular, the present disclosure relates to a system and method for machine learning-based brand advertising rate calculation in a video stream.

BACKGROUND OF THE INVENTION

Object detection in images and videos is one of the popular areas of technology development and is widely used in many applications, including television, surveillance systems, media, personal identification, and other areas. Depending upon the application where object detection is being used, the methodologies behind object detection differ from each other in the principles of training machine vision models. Different training machine vision models have a number of disadvantages when trying to use them in the field of video analysis to identify certain objects, in particular logos. Detection of advertising banners, logos, and other advertising media in a video stream is an urgent business requirement. Such detection makes it possible to evaluate the effectiveness of marketing programs and introduce a new type of advertising monetization method, for example, on television or on online video hosting sites.

Conventional tools and methods allow the detection of logos only if a machine vision model is trained on samples of these logos, which is often inconvenient for end users. Another disadvantage of conventional systems is the speed of adding new logos for detection, as this is associated with the process of retraining the machine learning model. Such a process of retraining can take from several hours to several days, depending on the complexity of the image and the final detection accuracy.

Furthermore, the conventional methods fail to provide a metric for different advertisement parameters. There is a need for a video processing system and method for analyzing video images and computing brand advertisement parameters that can be used for the purpose of monetization.

SUMMARY OF THE INVENTION

A system and method for performing brand detection and brand analysis on a video is disclosed. The method comprises receiving by a video splitter a video for performing brand detection; splitting, via the video splitter, the video for obtaining a plurality of video frames; providing the plurality of video frames to a brand detector for performing an open set detection on each input video frame from the plurality of video frames to compute instances of detecting brand media in each video frame of the plurality of video frames; determining by a semantic segmentation model a square region in which the brand media is occupied within the input video frame; resolving by the semantic segmentation model a scene understanding task in the input video frame; detecting by a video action recognition module in the video one or more crucial moments to provide crucial moment rating without performing any brand detection operation; identifying by the video action recognition model an area on the input frame where a user's attention is focused to provide a user focus index when viewed on screen without performing any brand detection operation thereon. The method further comprises generating, by a brand-appearance computing unit, heat maps using inputs from the video action recognition model and combining by the brand appearance computing unit inputs from the brand detector and the semantic segmentation model into the heat maps for all the input video frames of the video for computing a brand advertising rate.

In an alternative embodiment, the brand media comprises brand logos, brand taglines, and brand ambassador images.

In an alternative embodiment, the inputs used for computing the brand advertising rate include location of brand media appearance on each input video frame, duration of brand media appearance on each input video frame, the heat maps, the user focus index for each input video frame, and a crucial-moment indication for each input video frame.

In an alternative embodiment, the method further comprises performing, by the brand appearance computing unit, a comparison of the brand advertising rate for a specific brand in two or more videos.

In an alternative embodiment, the method further comprises performing, by the brand appearance computing unit, a comparison of the brand advertising rate for different brands in an input video.

A system for performing brand detection in a video is also disclosed. The system comprises a video splitter configured to receive the video for performing brand detection and further configured to split the video to obtain a plurality of video frames. A brand detector is configured to perform open set detection on each input video frame from the plurality of video frames to compute instances of detecting brand media in each video frame of the plurality of video frames. A semantic segmentation model is configured to determine a square region in which the brand media is occupied within the input video frame and resolve a scene-understanding task in the input video frame. A video action-recognition module is configured to detect in the video one or more crucial moments to provide a crucial-moment rating without performing any brand detection operation. The module is also configured to identify an area on the input frame where a user's attention is focused to provide user focus index when viewed on screen, without performing any brand detection operation thereon. A brand-appearance computing unit is configured to generate heat maps using inputs from the video action recognition model and combine inputs from the brand detector and the semantic segmentation model into the heat maps for all the input video frames of the video for computing a brand advertising rate.

In an alternative embodiment, the brand media comprises brand logos, brand taglines, and brand ambassador images.

In an alternative embodiment, the inputs used for computing the brand advertising rate include the location of brand media appearances on each input video frame, the duration of brand media appearances on each input video frame, the heat maps, the user focus index for each input video frame, and a crucial-moment indication for each input video frame.

In an alternative embodiment, the brand appearance computing unit is configured to perform comparison of the brand advertising rate for a specific brand in two or more videos.

In an alternative embodiment, the brand appearance computing unit is configured to perform comparison of the brand advertising rate for different brands in an input video.

DESCRIPTION OF THE DRAWINGS

FIG. 5 shows a block diagram of a method for performing brand detection and brand analysis on a video, in accordance with an embodiment of the present disclosure.

DETAILED DESCRIPTION

A system and a method perform brand detection and brand analysis in one or more videos for one or more specific brands. In accordance with one embodiment, a user imports the required video into the system. The system may be configured as an application that can be executed on any smart device. The system then creates a new project for the video and the user is prompted to use a pre-trained model or a no-model option within the system for detecting the brands of interest from the video. The system then analyzes the video frames for computing values for one or more brand advertisement parameters. A video frame comprises a single image in a sequence of pictures. The brand advertisement parameters are displayed to the user via the system user interface. In one implementation, the values of these one or more brand advertisement parameters can be used for coming up with unique monetization models for different brands.

Figure 1:
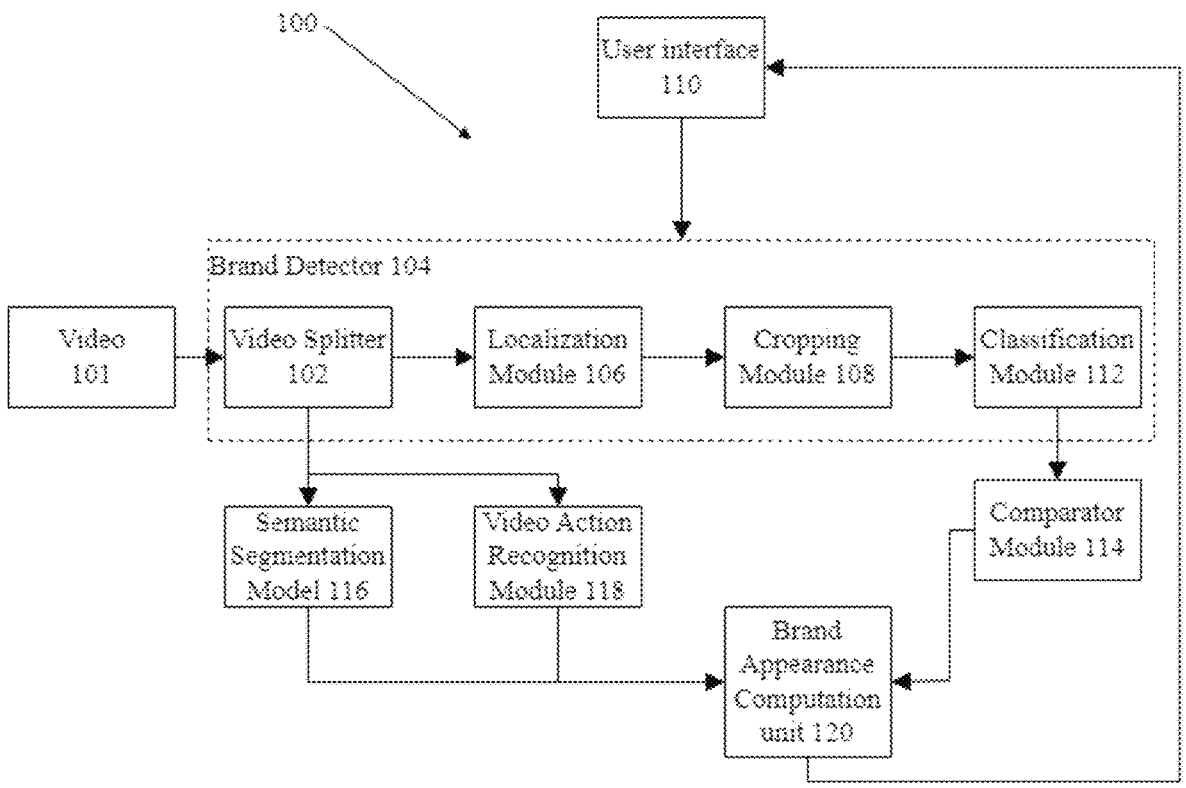
FIG. 1 shows a block diagram of a system for performing brand detection and brand analysis in a video, in accordance with an embodiment of the present disclosure.

FIG. 1 shows a block diagram of a system 100 for performing brand detection and brand analysis in a video 101 in accordance with an embodiment of the present disclosure. The system 100 comprises a video splitter 102 to receive the video 101 for performing the brand detection and brand analysis thereon. The video splitter 102 is configured to split the video 101 for obtaining a plurality of video frames. The system 100 further comprises a brand detector 104 for performing an open set detection on each input video frame from the plurality of video frames. Open set detection comprises the task of detecting brand media from input video frames without the use of a model pre-trained on particular brand examples. This differs from closed set detection, which refers to detecting brand media from input video frames with the use of a model pre-trained on particular brand examples. In one embodiment, the brand detector 104 is configured for computing instances of brand detection in each video frame of the plurality of video frames. In an embodiment, the brand detector 104 facilitates the provision of the per-video frame brand detects.

In one embodiment, the system 100 further comprises a semantic segmentation model 106 to determine a region occupied by a brand logo in the square bounding box of this brand within input video frames. In one embodiment, the semantic segmentation model 106 is further configured to perform a scene-understanding task. Scene understanding task comprises classifying each pixel on the frame by types of places, e.g., LED screen, floor, platform edge, field, etc. In an embodiment, U-Net, DINO, and Panoptic-DeepLab approaches can be used as semantic segmentation models for scene understanding.

In one embodiment, the system 100 further comprises a video action recognition model 108 to detect in the video one or more crucial moments to provide a crucial-moment rating without performing any brand detection operation thereon. More specifically, each video frame of the input video can be provided with a crucial-moment rating. For example, a video frame of a football match at a moment when a goal is being scored can have a maximum crucial-moment rating. For detection of the important moments in the video, the video action recognition models such as deep 3D convolutional neural networks (SlowFast R101) or Video transformers (MViT) can also be used. In one embodiment, the video action recognition model 108 is further configured to identify an area on the input frame where a user's attention is focused to provide user focus index when viewed on screen without performing any brand detection operation thereon. In one example, the estimation of the user attention field can be identified by video action recognition models such as Class Activation Maps.

In one embodiment, the system 100 further comprises a brand-appearance computing unit 110 to generate heat maps using inputs from the video action-recognition model 108. The heat maps are generated without any brand detection being performed on the input video frames. The same video frames for which the heat maps are generated are then provided to the brand detector 104 and the semantic segmentation model 106 for brand detection and scene-understanding tasks. The inputs from the brand detector 104 and the semantic segmentation model 106 are combined into the heat maps for all the input video frames of the video for computing a brand advertising rate. The brand advertising rate is a parameter that can be used to monetize brand advertising. In an embodiment, the inputs used for computing the brand advertising rate include location of brand media appearance on each input video frame, duration of brand media appearance on each input video frame, the heat maps, the user focus index for each input video frame, and the crucial-moment rating for each input video frame.

In one embodiment, brand appearance computing unit 110 can be configured to compute or generate a report with per-brand statistics, per-brand advertising value, heatmaps of brands appearing in the input video, and per-frame brand detects based on the inputs from the semantic segmentation model 106, the video action recognition model 108, and the brand detector 104.

Table 1 gives an exemplary output of the system 100, in accordance with an embodiment of the present disclosure.

| | exposure (square on the screen) | duration of appearance (is the brand detected on previous frame?) | position (X, Y) | motion index | landing | Angle of view | crucial moment (highlights) | user focus index | frame ADV rate |
|---|---|---|---|---|---|---|---|---|---|
| frame number | w1 | w2 | w3 | w4 | w5 | w6 | w7 | w8 | |
| 0 | 0% | 0 | — | 0 | — | — | 0 | 0.2 | 0 |
| 1 | 3% | 0 | 135; 120 | 0 | background | 15 | 0 | 0.3 | 0.02 |

-continued

| | exposure (square on the screen) | duration of appearance (is the brand detected on previous frame?) | position (X, Y) | motion index | landing | Angle of view | crucial moment (highlights) | user focus index | frame ADV rate |
|---|---|---|---|---|---|---|---|---|---|
| 2 | 15% | 1 | 280; 540 | 444 | foreground | 60 | 1 | 0.8 | 0.35 |
| 3 | 20% | 1 | 281; 548 | 8 | foreground | 61 | 1 | 0.8 | 0.39 aggregated ADV rate = 0.19 |

Table 1 specifically shows exemplary video fragments comprising 4 image video frames, on which brand A was detected, and on which brand A only appears on frame number 1, 2, and 3. Parameters like exposure, duration, and the like are measured and given a certain weight (w1, w2, wn). In an implementation, if the weights w1, w2, wn are static, then the brand advertising rate (ADV rate) is calculated using an expert system (a formula) of calculation by the brand appearance computing unit 110.

In another implementation, the brand-appearance computing unit 110 a neural network trained for calculations and the neural network determines weights depending on the training process. In one example, the training process takes a number of short video fragments, each of which contains a brand in different positions, focus, motions, exposure, and so on. In the course of the training, each video is labeled or rated by a supervisor. The resulting model will be used to predict the final brand advertising rate for the brand.

In yet another example, the brand-appearance computing unit 110 can include usage of multiple machine learning models each of which operates with a particular parameter and as a result returns the value of the brand advertising rate based on exposure, brand advertising rate based on duration, etc. All of these sub-values can then be aggregated using some function taking into account weight of each parameter or using an additional machine learning model to combine all sub-values in one final brand advertising rate.

Figure 2:
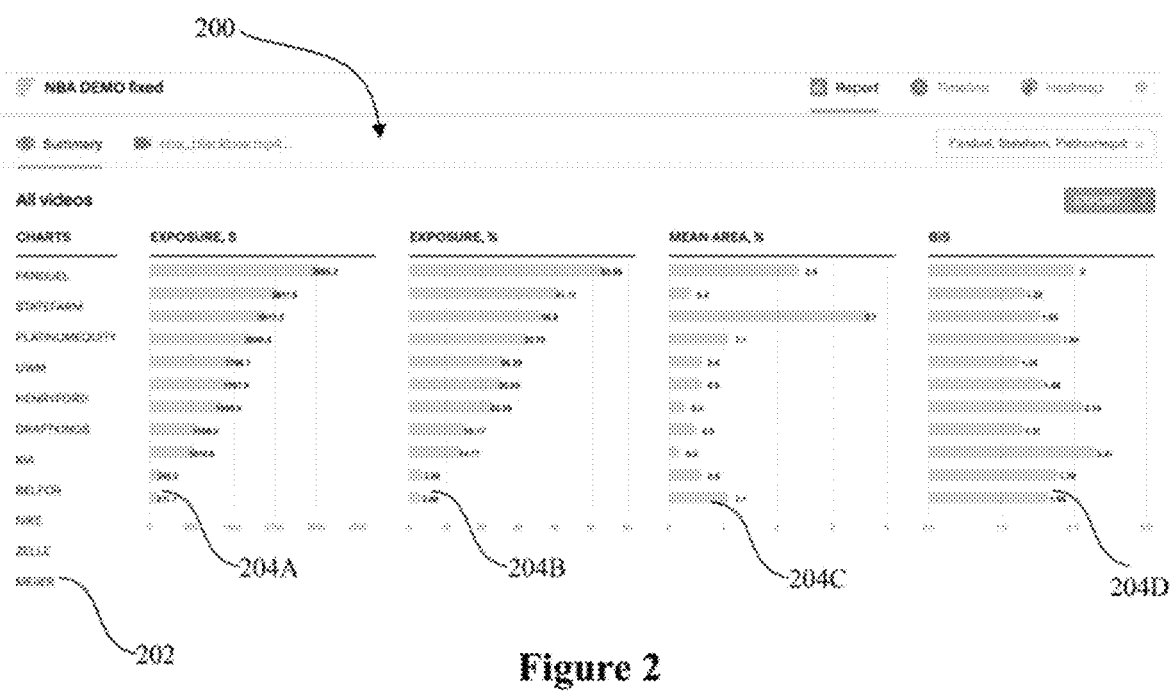
FIG. 2 shows a photographic view of an exemplary report with per-brand statistics for video of a National Basketball Association (NBA) match, in accordance with an embodiment of the present disclosure.
Figure 3:
FIG. 3 shows a photographic view of a video frame from the video used in the generation of the report of FIG. 2.

FIG. 2 shows a photographic view of an exemplary report 200 with per-brand statistics for video of an NBA match, in accordance with an embodiment of the present disclosure. FIG. 3 shows a photographic view of a video frame from the video used in the generation of the report of FIG. 2. As seen in FIG. 2, the exemplary report 200 comprises a list of brands 202 that are of interest to the user of the system 100. Columns 204A, 204B, 204C, and 204D show the values of exposure duration, exposure percentage, exposure mean area, and BIS value corresponding to the brands 202. The brand index score (BIS) value is brand advertising value that is computed using the unique brands advertising value formula. FIG. 3 shows the results of analysis of the video frame, wherein detections 302 are listed just beside the video frame being analyzed. As seen in FIG. 3, the mean area being occupied by the brand media within the screen is provided as well.

Figure 4:
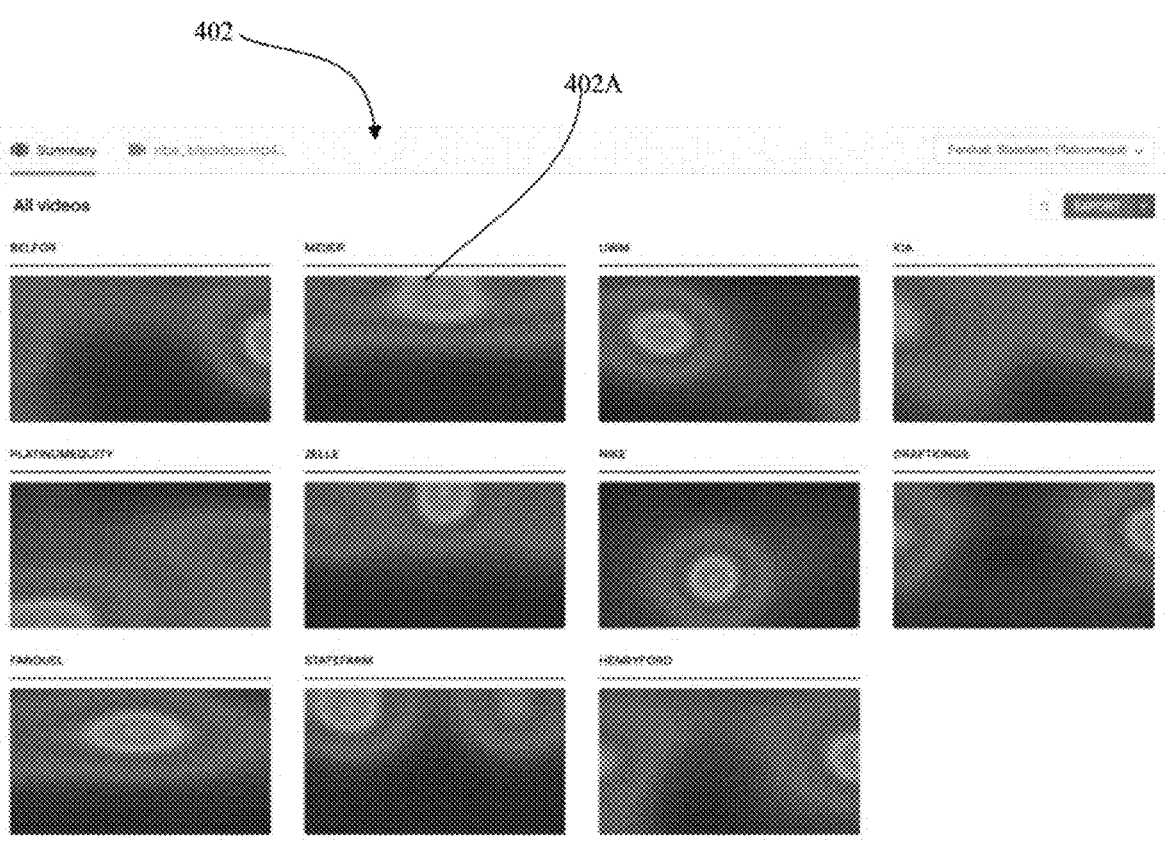
FIG. 4 shows a photographic view of heat maps generated by the brand appearance computing unit, in accordance with an embodiment of the present disclosure.

FIG. 4 shows a photographic view of heatmaps 402 generated by the brand appearance computing unit 110, in accordance with an embodiment of the present disclosure. As seen in FIG. 4, heatmaps 402 indicate the exposure that the brand media is getting positioned on the screen of the user. For example, the heatmap 402A for the brand "MEIJER" indicates that the brand media of the brand is visible to the user in the middle of the screen, and is well within the user's focus.

The brand-appearance computing unit 110 can also be configured to provide comparative data associated with one or more brands in one or more videos. Comparative data gives insight to the user on how to improve an advertising model. For example, parameters such as brand media placement, expected brand exposure duration in that placement, and the like can be improved upon using comparative data.

In one implementation, the user provides a video of interest, on which brand analysis is to be performed. Brand analysis comprises analyzing an input video to compute one or more brand parameter values for one or more brands by detecting appearance, position, duration, and so on for a brand media in the video. Brand media comprises brand logos, brand taglines, and brand ambassador images. For the video of interest, the brand-appearance computing unit 110 takes inputs from the semantic segmentation model 106, the video action recognition model 108, and the brand detector 104 for computing the brand advertising rates for all the brands present in the input video. After these values are obtained, the user can then, via the user interface 112, instruct the system 100 to provide a report depicting comparison of the brand advertising rates with reach per-brand appearance statistics for different brands in the input video. The comparative data can allow the user to make more informed decisions associated with their advertisement strategies.

In another implementation, the brand appearance computing unit 110 can be configured to perform comparison of the brand advertising rate for a specific brand in two or more videos. Such a comparison allows the user to analyze which of the two or more advertisement strategies have worked better for the specific brand, thereby allowing the user to make an informed decision about future advertisement strategies.

FIG. 5 shows a block diagram of a method 500 for performing brand detection and brand analysis on a video 101, in accordance with an embodiment of the present disclosure.

At block 502, the method 500 comprises receiving by a video splitter 102 the video 101 for performing the brand detection thereon.

At block 504, the method 500 comprises splitting by the video splitter 102 the video101 for obtaining a plurality of video frames.

At block 506, the method 500 comprises providing the plurality of video frames to a brand detector 104 for performing an open set detection on each input video frame from the plurality of video frames to compute instances of detecting brand media in each video frame of the plurality of video frames. In an embodiment, this step facilitates the provision of the per-video frame brand detections.

At block 508, the method 500 comprises determining by a semantic segmentation model 106 an exact region in which the brand media is occupied within the square bounding box of this brand within the input video frame. At block 510, the method 500 comprises resolving, with the semantic segmentation model 106, a scene-understanding task in the input video frame. A scene-understanding task comprises classifying each pixel on the frame by types of places, e.g., LED screen, floor, platform edge, field, and so on. In an embodiment, U-Net, DINO, and Panoptic-DeepLab approaches can be used as semantic segmentation models for scene understanding.

At block 512, the method 500 comprises detecting by a video action recognition module 108 in the video one or more crucial moments to provide crucial moment indication without performing any brand detection operation thereon. For example, a video frame of a football match at a moment when a goal is being scored can have a maximum crucial-moment rating. For detection of the important moments in the video, the video action recognition models such as deep 3D convolutional neural networks (SlowFast R101) or Video transformers (MViT) can also be used.

At block 514, the method 500 comprises identifying by the video action recognition model 108 an area on the input frame where a user's attention is focused to provide user-focus index when viewed on screen without performing any brand-detection operation thereon. In one example, the estimation of the user-attention field can be identified by video action recognition models such as Class Activation Maps.

At block 516, the method 500 comprises generating by a brand appearance computing unit heat maps using inputs from the video action recognition model. At block 518, the method 500 comprises combining, by the brand appearance computing unit, inputs from the brand detector and the semantic-segmentation model into the heat maps for all the input video frames of the video for computing a brand advertising rate.

More specifically, the heat maps are generated without any brand detection being performed on the input video frames. The same video frames for which the heat maps are generated are then provided to the brand detector 104 and the semantic segmentation model 106 for brand detection and scene understanding tasks. The inputs from the brand detector 104 and the semantic segmentation model 106 are combined into the heat maps for all the input video frames of the video for computing the brand advertising rate. The brand advertising rate is a parameter that can be used to monetize brand advertising. In an embodiment, the inputs used for computing the brand advertising rate comprise the location of brand media appearances on each input video frame, the duration of brand media appearances on each input video frame, the heat maps, the user focus index for each input video frame, and crucial moment rating for each input video frame.

In an embodiment, the method 500 includes providing comparative data associated with one or more brands in one or more videos. Comparative data is an important aspect that can give insight to the user on how to improve the existing advertising model. For example, parameters such as brand media placement, expected brand exposure duration in that placement, and the like can be improved upon using comparative data.

In one implementation, according to method 500, the user can provide a video of interest, on which brand analysis is to be performed. For the video of interest, the method 500 comprises receiving at the brand-appearance computing unit 110 inputs from the semantic-segmentation model 106, the video action-recognition model 108, and the brand detector

104 for computing the brand advertising rates for all the brands present in the input video. After these values are obtained, the user can then, via the user interface 112, query for a report comparing brand advertising rates with reach per-brand appearance statistics for different brands in the input video. As mentioned above, the comparative data can allow the user to make more informed decisions associated with their advertisement strategies.

In another implementation, the method 500 comprises can be configured performing comparison of the brand advertising rate for a specific brand in two or more videos. Such a comparison allows the user to analyze which of the two or more advertisement strategies have worked better for the specific brand, thereby allowing the user to make an informed decision about future advertisement strategies.

The invention claimed is:

1. A method for performing brand detection and brand analysis on a video, the method comprising:
   receiving by a video splitter the video for performing the brand detection;
   splitting, via the video splitter, the video to obtain a plurality of video frames;
   providing the plurality of video frames to a brand detector for performing an open set detection on each input video frame from the plurality of video frames to compute instances of detecting brand media in each video frame of the plurality of video frames;
   determining by a semantic-segmentation model a square region in which the brand media is occupied within the input video frame;
   resolving by the semantic segmentation model a scene understanding task in the input video frame;
   detecting by a video action recognition module in the video one or more crucial moments and providing an objective crucial moment rating for each input video frame of the plurality of video frames without performing any brand detection operation thereon;
   identifying by the video action recognition module an area on the input frame where a user's attention is focused to provide a user-focus index for each input video frame of the plurality of video frames when viewed on a screen without performing any brand detection operation thereon;
   generating by a brand-appearance computing unit a plurality of heat maps using inputs from the video action-recognition module; and
   combining, by the brand-appearance computing unit, inputs from the brand detector and the semantic-segmentation model into at least one of the heat maps using all the input video frames of the plurality of video frames and computing a brand advertising rate, wherein the inputs comprise, for each input video frame of the plurality of video frames, a location of brand media appearance on the input video frame, a duration of brand media appearance on the input video frame, and at least one of parameters: the user focus index for the video frame, or the crucial-moment rating for the input video frame.

2. The method according to claim 1, wherein the brand media comprises brand logos, brand taglines, and brand ambassador images.

3. The method according to claim 1, wherein each of the inputs used for computing the brand advertising rate including the location of brand media appearance on the input video frame, the duration of brand media appearance of the input video frame the user focus index of the input video frame, and the crucial-moment rating of the input video frame is provided with a weighting value.

4. The method according to claim 1, further comprising performing, by the brand-appearance computing unit, a comparison of the brand advertising rate for a specific brand in two or more videos.

5. The method according to claim 1, further comprising performing, by the brand appearance computing unit, a comparison of the brand advertising rate for different brands in an input video.

6. A system for performing brand detection in a video, the system comprising:

a video splitter to receive the video for performing brand detection, the video splitter configured to split the video to obtain a plurality of video frames;

a brand detector for performing open set detection on an input video frame from the plurality of video frames to compute instances of detecting brand media in a video frame of the plurality of video frames;

a semantic segmentation model configured to:

determine a square region in which the brand media is occupied within the input video frame; and resolve a scene understanding task in the input video frame;

a video action recognition module configured to:

detect in the video one or more crucial moments and provide an objective crucial moment rating for each input video frame of the plurality of video frames without performing any brand detection operation; and identify an area on the input frame where a user's attention is focused to provide user-focus index for each input video frame of the plurality of video frames when viewed on screen without performing any brand-detection operation thereon;

a brand-appearance computing unit configured to:

generate heat maps using inputs from the video action recognition module; and combine inputs from the brand detector and the semantic segmentation model into at least one of the heat maps using all the input video frames of the plurality of video frames and compute a brand advertising rate, wherein the inputs comprise, for each input video frame of the plurality of video frames, a location of brand media appearance on the input video frame, a duration of brand media appearance on the input video frame, and at least one of parameters: the user focus index for the video frame, or the crucial-moment rating for the input video frame.

7. The system according to claim 6, wherein the brand media comprises brand logos, brand taglines, and brand ambassador images.

8. The system according to claim 6, wherein each of the inputs used for computing the brand advertising rate including the location of brand media appearance on the input video frame, the duration of brand media appearance of the input video frame, the user focus index of the input video frame, and the crucial-moment rating of the input video frame is provided with a weighting value.

9. The system according to claim 6, wherein the brand appearance computing unit is configured to perform comparison of the brand advertising rate for a specific brand in two or more videos.

10. The system according to claim 6, wherein the brand-appearance computing unit is configured to perform comparison of the brand advertising rate for different brands in an input video.

11. The method according to claim 1, wherein the performing an open set detection comprises detecting the brand media from the plurality of video frames without the use of a model pre-trained on particular brand examples.

12. The method according to claim 11, wherein the brand media is detected from each of the plurality of video frames.

13. The method according to claim 1, wherein the scene understanding task includes classifying each pixel in each of the plurality of video frames by type of place.

14. The method according to claim 1, wherein the video action recognition module implements a convolutional neural network model.

15. The method according to claim 14, wherein convolutional neural network model output is interpreted by a class activation map.

16. The system according to claim 6, wherein performing open set detection comprises detecting the brand media from the plurality of video frames without the use of a model pre-trained on particular brand examples.

17. The system according to claim 16, wherein the brand media is detected from each of the plurality of video frames.

18. The system according to claim 6, wherein the scene understanding task includes classifying each pixel in each of the plurality of video frames by type of place.

19. The system according to claim 6, wherein the video action recognition module implements a convolutional neural network model.

20. The system according to claim 19, wherein convolutional neural network model output is interpreted by a class activation map.

\* \* \* \* \*